US012681829B2

(12) United States Patent
Cary et al.

(10) Patent No.: US 12,681,829 B2
(45) Date of Patent: Jul. 14, 2026

(54) TECHNIQUES FOR MANAGING ACTIVITY INFORMATION ASSOCIATED WITH USER APPLICATIONS

(71) Applicant: Apple Inc., Cupertino, CA (US)

(72) Inventors: James B. Cary, Mountain View, CA (US); Forest A. Hill, Lafayette, CO (US); Eugene Dvortsov, San Francisco, CA (US); Michael J. Lamb, San Jose, CA (US); John B. Rowe, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 472 days.

(21) Appl. No.: 18/479,038

(22) Filed: Sep. 30, 2023

(65) Prior Publication Data

US 2024/0403184 A1      Dec. 5, 2024

Related U.S. Application Data

(60) Provisional application No. 63/506,075, filed on Jun. 3, 2023.

(51) Int. Cl.
　G06F 11/34　　　(2006.01)
　G06F 9/451　　　(2018.01)
(52) U.S. Cl.
　CPC .......... G06F 11/3409 (2013.01); G06F 9/451 (2018.02)
(58) Field of Classification Search
　CPC .............................. G06F 11/3409; G06F 9/451
　See application file for complete search history.

(56) References Cited

U.S. PATENT DOCUMENTS

| | | | | |
|---|---|---|---|---|
| 9,049,259 | B2 * | 6/2015 | Rathod ................. | H04L 65/403 |
| 9,959,010 | B1 * | 5/2018 | Yu ......................... | G06F 21/316 |
| 10,860,988 | B2 * | 12/2020 | Pierce ...................... | G06F 9/54 |
| 2013/0069962 | A1 * | 3/2013 | Nealer .............. | H04M 1/72427 |
| | | | | 345/522 |
| 2014/0351268 | A1 * | 11/2014 | Weskamp ......... | G06F 16/24578 |
| | | | | 715/251 |
| 2017/0286046 | A1 * | 10/2017 | Pardi ...................... | G06F 3/0482 |
| 2017/0357426 | A1 * | 12/2017 | Wilson ................ | G06F 3/04886 |
| 2019/0012821 | A1 * | 1/2019 | Bu ............................. | G06F 8/61 |
| 2025/0156040 | A1 * | 5/2025 | Wang ........................ | G06F 8/61 |

* cited by examiner

*Primary Examiner* — James R Turchen
(74) *Attorney, Agent, or Firm* — DICKINSON WRIGHT RLLP

(57) ABSTRACT

The embodiments set forth techniques for managing activity information associated with user applications. According to some embodiments, the techniques can include a method that is implemented by an activity application executing on a computing device, and includes the steps of (1) receiving, from an activity manager executing on the computing device, an indication that a particular functionality is being implemented by a user application executing on the computing device, (2) querying the activity manager for activity information associated with the particular functionality, (3) compositing the activity information into a user interface that is managed by the activity application, and (4) causing the user interface to be output to a display device that is communicatively coupled to the computing device.

20 Claims, 5 Drawing Sheets

100

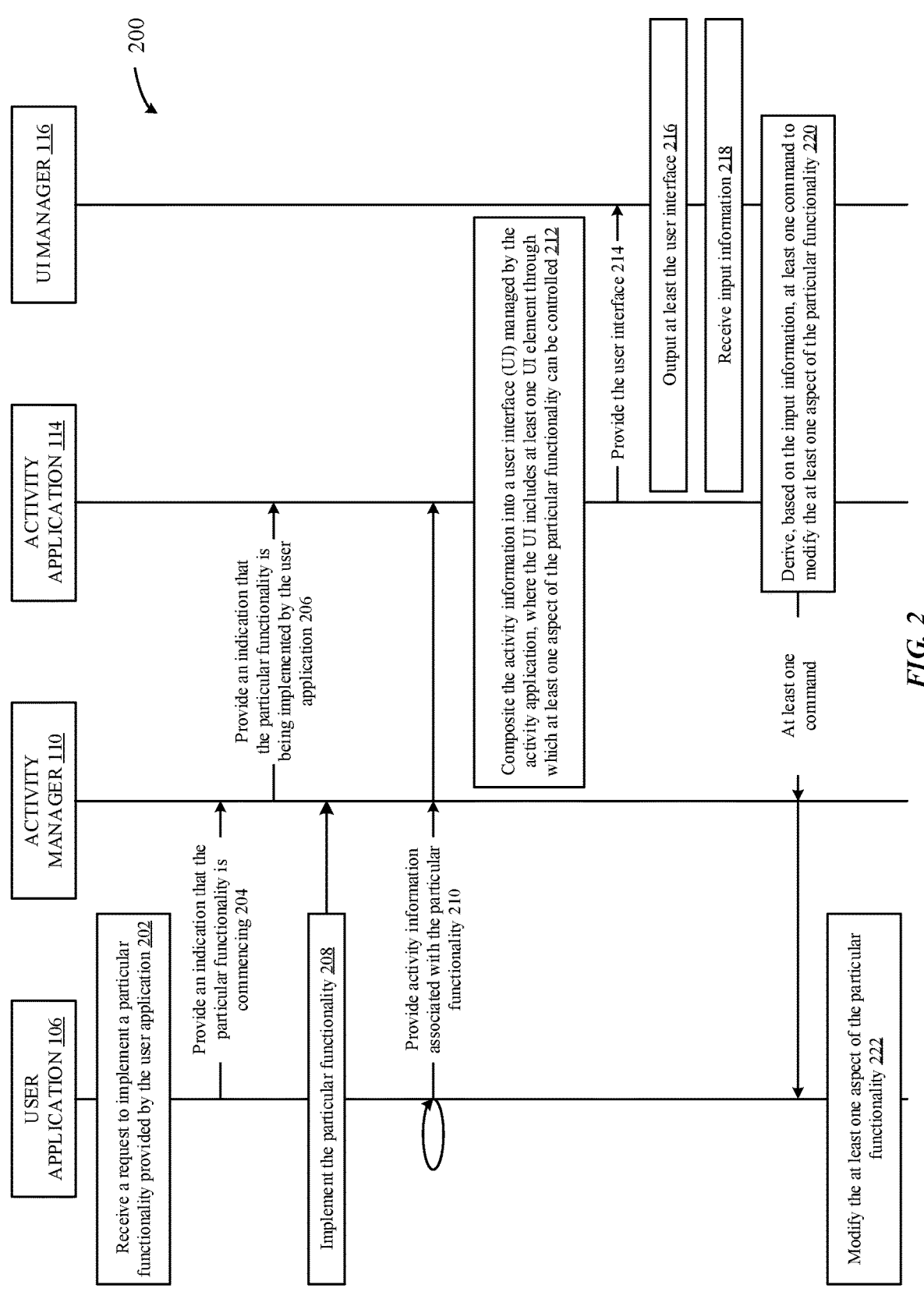

UI MANAGER 116

ACTIVITY APPLICATION 114

ACTIVITY MANAGER 110

USER APPLICATION 106

Receive a request to implement a particular functionality provided by the user application 202

Provide an indication that the particular functionality is commencing 204

Provide an indication that the particular functionality is being implemented by the user application 206

Implement the particular functionality 208

Provide activity information associated with the particular functionality 210

Composite the activity information into a user interface (UI) managed by the activity application, where the UI includes at least one UI element through which at least one aspect of the particular functionality can be controlled 212

Provide the user interface 214

Output at least the user interface 216

Receive input information 218

Derive, based on the input information, at least one command to modify the at least one aspect of the particular functionality 220

At least one command

Modify the at least one aspect of the particular functionality 222

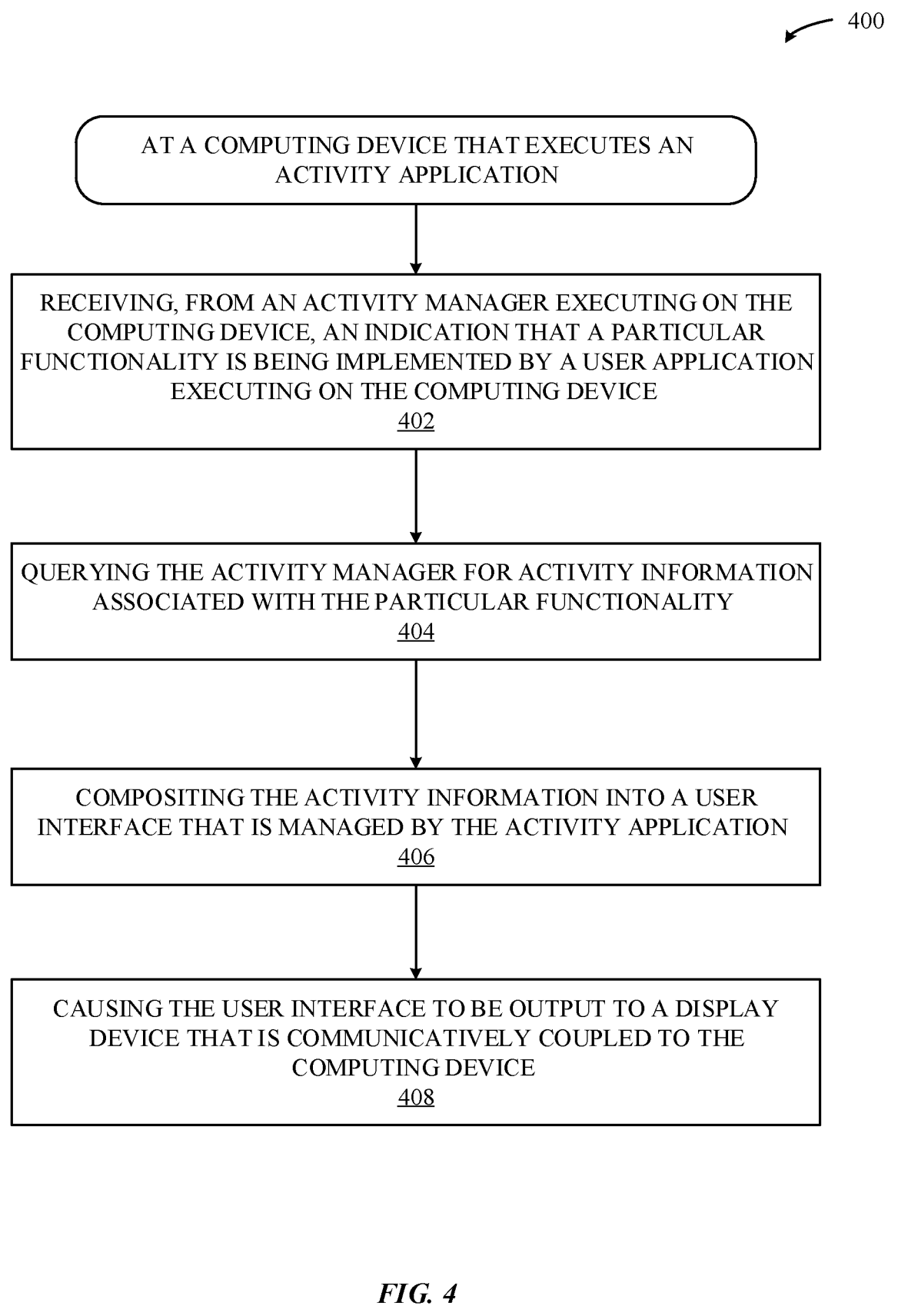

400

AT A COMPUTING DEVICE THAT EXECUTES AN
ACTIVITY APPLICATION

RECEIVING, FROM AN ACTIVITY MANAGER EXECUTING ON THE
COMPUTING DEVICE, AN INDICATION THAT A PARTICULAR
FUNCTIONALITY IS BEING IMPLEMENTED BY A USER APPLICATION
EXECUTING ON THE COMPUTING DEVICE
402

QUERYING THE ACTIVITY MANAGER FOR ACTIVITY INFORMATION
ASSOCIATED WITH THE PARTICULAR FUNCTIONALITY
404

COMPOSITING THE ACTIVITY INFORMATION INTO A USER
INTERFACE THAT IS MANAGED BY THE ACTIVITY APPLICATION
406

CAUSING THE USER INTERFACE TO BE OUTPUT TO A DISPLAY
DEVICE THAT IS COMMUNICATIVELY COUPLED TO THE
COMPUTING DEVICE
408

*FIG. 4*

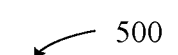
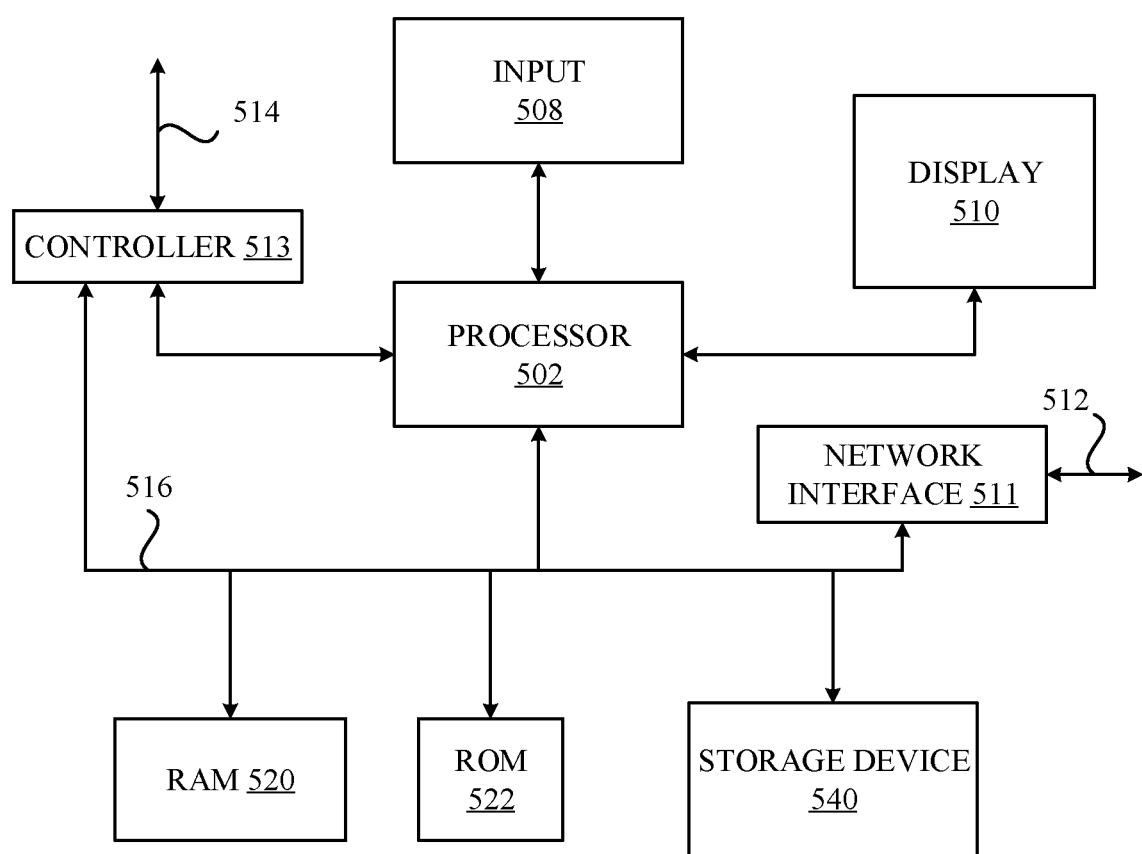
*FIG. 5*

TECHNIQUES FOR MANAGING ACTIVITY INFORMATION ASSOCIATED WITH USER APPLICATIONS

CROSS-REFERENCE TO RELATED APPLICATIONS

The present application claims the benefit of U.S. Provisional Application No. 63/506,075, entitled "TECHNIQUES FOR MANAGING ACTIVITY INFORMATION ASSOCIATED WITH USER APPLICATIONS," filed Jun. 3, 2023, the content of which is incorporated by reference herein in its entirety for all purposes.

FIELD

The described embodiments relate generally to managing activity information associated with user applications executing on a computing device. More particularly, the described embodiments provide techniques for implementing activity applications on the computing device, where each activity application manages a respective functionality and manages a respective specialized user interface. In this manner, each activity application can identify activity information that corresponds to its respective functionality and composite the activity information into its respective specialized user interface. In turn, a user interface manager can display one or more of the respective specialized user interfaces of the activity applications to provide an organized overview of the activity information.

BACKGROUND

Wearable computing devices, such as fitness trackers, have gained significant popularity due to their compact size and ability to provide users with real-time health and fitness data. However, these devices also come with inherent limitations, particularly in terms of screen sizes and user interfaces, which can impact their usability and functionality.

One of the primary limitations of wearable devices is their small screen size. Fitness trackers typically feature a tiny display that is optimized for showing limited information at a glance. While this design choice helps to keep the device compact and lightweight, it also restricts the amount of data that can be displayed simultaneously. Consequently, users often find it challenging to read detailed information or navigate complex interfaces. This limitation can be especially pronounced for individuals with visual impairments or those who require larger text and graphics.

Another constraint associated with wearable computing devices is the inherent trade-off between screen size and device battery life. As screens consume a significant amount of power, manufacturers often opt for smaller displays to ensure longer battery longevity. While this decision benefits the device's overall usability, it places constraints on the complexity and richness of the user interface. The limited screen real estate may hinder the inclusion of advanced features and interactive elements that enhance the user experience, such as touch gestures or detailed visual representations.

Additionally, the reduced screen size of wearable devices can present challenges in terms of user interaction. Traditional touch-based interfaces, which rely on large screens, may not be feasible on fitness trackers due to the limited surface area. Instead, manufacturers often utilize button-based interfaces or simple touch-sensitive surfaces to navigate through menus and interact with the device. This can lead to a more constrained and less intuitive user experience compared to larger devices like smartphones or tablets.

Additionally, the small screen size of wearable devices may limit the amount of data that can be displayed simultaneously, leading to information overload or a lack of context. Fitness trackers typically prioritize displaying a subset of essential information, such as step count, heart rate, or notifications. However, users may miss out on more detailed insights or struggle to comprehend complex data visualizations due to the constrained screen size. This limitation can reduce the effectiveness of wearable devices in providing users with comprehensive and actionable information about their health and fitness.

Accordingly, it is desirable to improve the manner in which user interfaces are generated and displayed on computing devices having smaller displays.

SUMMARY

The described embodiments relate generally to managing activity information associated with user applications executing on a computing device. More particularly, the described embodiments provide techniques for implementing activity applications on the computing device, where each activity application manages a respective functionality and manages a respective specialized user interface. In this manner, each activity application can identify activity information that corresponds to its respective functionality and composite the activity information into its respective specialized user interface. In turn, a user interface manager can display one or more of the respective specialized user interfaces of the activity applications to provide an organized overview of the activity information. Such techniques provide a number of benefits, not which of least includes the ability for content of third-party software applications to be included in the organized overview without needing to provide respective specialized user interfaces. Such techniques also provide enhanced experiences for end-users in that the organized overview—as well as the specialized user interfaces included therein—remain consistent and familiar to the end-users.

One embodiment sets forth a method for managing activity information associated with user applications. According to some embodiments, the method can be implemented by an activity application executing on a computing device, and includes the steps of (1) receiving, from an activity manager executing on the computing device, an indication that a particular functionality is being implemented by a user application executing on the computing device, (2) querying the activity manager for activity information associated with the particular functionality, (3) compositing the activity information into a user interface that is managed by the activity application, and (4) causing the user interface to be output to a display device that is communicatively coupled to the computing device.

Other embodiments include at least one non-transitory computer readable storage medium configured to store instructions that, when executed by at least one processor included in a computing device, cause the computing device to carry out the various steps of any of the foregoing methods. Further embodiments include a computing device that includes at least one processor, and at least one memory storing instructions that, when executed by the at least one processor, cause the computing device to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIG. 2 illustrates a sequence diagram of techniques for managing activity information associated with user applications, according to some embodiments.

FIG. 4 illustrates a method for managing activity information associated with user applications, according to some embodiments.

FIG. 5 illustrates a detailed view of a computing device that can be used to implement the various techniques described herein, according to some embodiments.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description, and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments relate generally to managing activity information associated with user applications executing on a computing device. More particularly, the described embodiments provide techniques for implementing activity applications on the computing device, where each activity application manages a respective functionality and manages a respective specialized user interface. In this manner, each activity application can identify activity information that corresponds to its respective functionality and composite the activity information into its respective specialized user interface. In turn, a user interface manager can display one or more of the respective specialized user interfaces of the activity applications to provide an organized overview of the activity information.

A more detailed discussion of these techniques is set forth below and described in conjunction with FIGS. 1-5, which illustrate detailed diagrams of systems and methods that can be used to implement these techniques.

Figure 1:
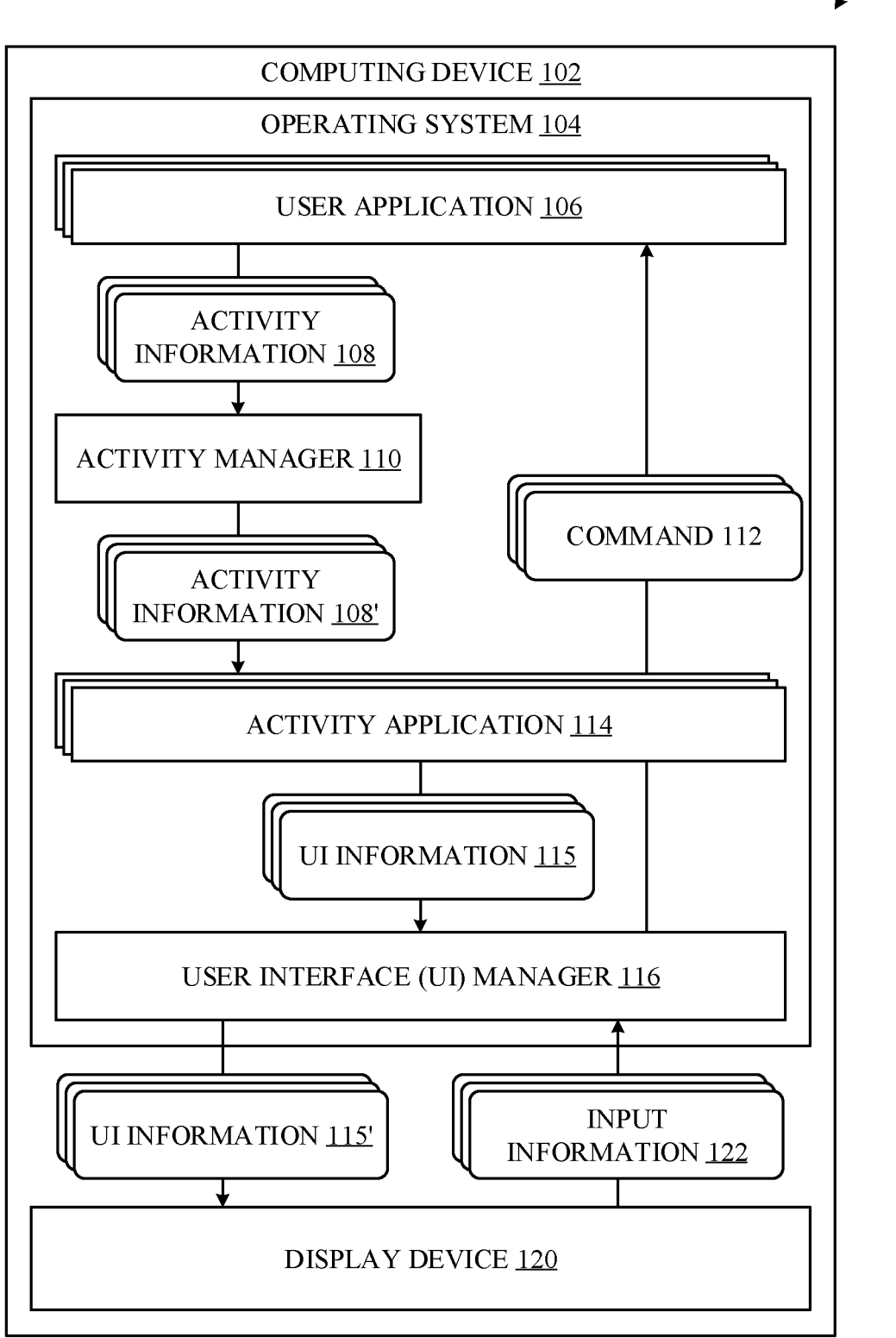
FIG. 1 illustrates a system diagram of a computing device that can be configured to perform the various techniques described herein, according to some embodiments.

FIG. 1 illustrates a block diagram of different components of a system 100 that can be configured to implement the various techniques described herein, according to some embodiments. As shown in FIG. 1, the system 100 can include a computing device 102, which can represent any type, form, etc., of a computing device, such as a wearable computing device, a smartphone computing device, a tablet computing device, a laptop computing device, a desktop computing device, a set-top box computing device, and so on. As shown in FIG. 1, the computing device 102 can execute an operating system 104. According to some embodiments, the operating system 104 can execute any number of user applications 106, which can represent software applications that are native to the operating system 104, third-party applications that are installed on the operating system 104, and so on. It is noted that the illustration of FIG. 1 omits other components that can be included in the operating system 104 (e.g., system files, daemons, etc.)/ computing device 102 in the interest of simplifying this disclosure.

According to some embodiments, the user applications 106 can implement various functionalities, such as media playback functionalities, exercise tracking functionalities, time-related functionalities (e.g., calendars, reminders, timers, etc.), media recording functionalities, smart home functionalities, and so on. It is noted that the foregoing examples are not meant to be limiting, and that the user applications 106 can provide any type, form, kind, etc., of functionalities without departing from the scope of this disclosure. In any case, each user application 106 can output activity information 108 that is associated with the functionalities that the user application 106 implements. For example, a user application 106 that specializes in exercise tracking can, using activity information 108, indicate when an exercise activity has started, as well as provide any number, form, etc., of exercise metrics. In another example, a user application 106 that specializes in media playback can, using activity information 108, indicate when playback of media content has commenced, a current point of the playback of the media content, album art associated with the media content, and so on. It is noted that the foregoing examples are not meant to be limiting, and that the activity information 108 can be utilized by the user applications 106 to convey any type, form, etc., of information, at any level of granularity. In any case, the activity information 108 can be provided to an activity manager 110 that executes by way of the operating system 104.

According to some embodiments, the activity manager 110 can be configured to function as a centralized entity that receives, processes, organizes, stores, etc., the activity information 108. As described in greater detail herein, the activity manager 110 can also function as a centralized entity that provides the activity information 108 to other entities executing on the operating system 104, such as activity applications 114. The activity manager 110 can be implemented using a variety of approaches that enable communications to be facilitated between the activity manager 110 and the user applications 106. For example, the activity manager 110 can implement an Application Programming Interface (API) that includes functions that are accessible to the user application 106 and that enable the activity information 108 to effectively be provided to the activity manager 110. In another example, the activity manager 110 can implement a database that is accessible to the user applications 106 and into which activity information 108 can be stored. It is noted that the foregoing examples are not meant to be limiting, and that the activity manager 110 can be implemented using any approach that effectively enables the user applications 106 to provide the activity information 108 to the activity manager 110.

According to some embodiments, the activity manager 110 can be configured to process the activity information 108 in conjunction with receiving the activity information 108 from user applications 106. For example, the activity manager 110 can organize the activity information 108 for a given user application 106 into a respective storage container (e.g., a file, a folder, a database, etc.). In another example, the activity manager 110 can supplement the activity information 108 with additional information (e.g., timing information, enhancement information, etc.). In yet another example, the activity manager 110 can eliminate redundant information within the activity information 108. Such modifications are represented in FIG. 1 by the activity information 108' that is provided to activity applications 114. It is noted that the foregoing examples are not meant to be limiting, and that the activity manager 110 can be configured to process the activity information 108 using any approach, at any level of granularity, without departing from the scope of this disclosure.

As shown in FIG. 1, the activity manager 110 can provide activity information 108 to activity applications 114 executing on the operating system 104. According to some embodiments, a given activity application 114 can represent a software application that is native to the operating system 104 and that manages at least one particular type of functionality that is common among and provided by at least one user application 106 and the activity application 114. For example, a given activity application 114 can represent an exercise tracking application that is native to the operating system 104 and that both (1) provides its own exercise tracking functionalities, and (2) is capable of overseeing exercise tracking functionalities implemented by one or more user applications 106. In this manner, the foregoing activity application 114 can provide a unified user interface through which users can (1) access exercise tracking features provided by the activity application 114 (and/or the one or more user applications 106), and (2) view exercise tracking metrics provided by the activity application 114 (and/or received from the one or more user applications 106 that implement exercise tracking functionalities (and report exercise metrics to the activity application 114 via the activity manager 110)). It is noted that the foregoing activity application 114 can be a third-party (or other type of) application (rather than a native one) without departing from the scope of this disclosure.

Additionally, and according to some embodiments, a given activity application 114 can represent a software application that is native to the operating system 104 and that manages at least one particular type of functionality that is provided by at least one user application 106 (where the functionality is not necessarily provided by the activity application 114 itself). For example, a given activity application 114 can represent a media controller application that is native to the operating system 104 and that is capable of controlling media playback functionalities implemented by at least one user application 106. In this manner, the activity application 114 can provide a unified user interface through which a user can control media playback functionalities that are implemented by the at least one user application 106. For example, the activity application 114 can identify a user application 106 that is functioning as a primary playback source on the computing device 102 and provide control over the primary playback source (e.g., pause, play, forward, reverse, volume up, volume down, etc.). Again, it is noted that the foregoing activity application 114 can be a third-party (or other type of) application (rather than a native one) without departing from the scope of this disclosure.

As shown in FIG. 1, the activity applications 114 can output user interface information 115 to a user interface manager 116 executing on the operating system 104. According to some embodiments, the user interface information 115 provided by a given activity application 114 can represent a specialized user interface that is complementary to a primary user interface of the activity application 114. For example, the primary user interface of a given activity application 114 can include all features, information, etc., that is normally provided when the activity application 114 is activated (e.g., in full view) on the computing device 102, whereas the specialized user interface of the activity application 114 can include a subset of the features, information, etc., normally provided in the primary user interface. In this manner, the specialized user interface can effectively provide a condensed view of the relevant controls, information, etc., normally provided in the primary user interface. This condensed view can be useful when it is desirable to provide unified view of the user interfaces of two or more activity applications 114 that otherwise constrains the amount of screen real estate that is available to display the user interfaces. It is noted that the foregoing examples are not meant to be limiting, and that the user interface information 115 can represent the primary user interface of an activity application 114 (e.g., a scaled-down snapshot of the primary user interface), the specialized user interface of the activity application 114, or some other user interface of the activity application 114, without departing from the scope of this disclosure.

As shown in FIG. 1, the user interface manager 116 can output user interface information 115' to a display device 120 that is communicatively coupled to the computing device 102. According to some embodiments, user interface manager 116 can process the user interface information 115 in any manner prior to providing the user interface information 115 to the display device 120 (as indicated by user interface information 115' in FIG. 1). The processing can also include, for example, scaling, resizing, color correcting, compressing, etc., the user interface information 115. The processing can also include, for example, combining two or more of the user interfaces of the activity applications 114 (accessible via the corresponding user interface information 115') into a single user interface (e.g., such as those illustrated in FIG. 3 and described below). It is noted that the foregoing examples are not meant to be limiting, and that the user interface manager 116 can process the user interface information 115 in any capacity, at any level of granularity, prior to outputting the user interface information 115' to the display device 120.

Additionally, and as shown in FIG. 1, the display device 120 can provide input information 122 to the user interface manager 116. For example, when the display device 120 has touch-sensing capabilities, the input information 122 can represent touch coordinate information, touch area information, pressure information, motion information, gesture information, and so on. In turn, the user interface manager 116 and/or the activity application 114 can generate commands 112 that correspond to the input information 122. For example, when the user interface manager 116 receives input information 122, the user interface manager 116 can reference the user interface information 115' to identify the activity application 114 to which the input information 122 corresponds, and then provide the input information 122 to the activity application 114. In turn, the activity application 114 can analyze the input information 122 to identify one or more commands 112 that correspond to the input information 122. For example, when the activity application 114 is a media playback controller, and the input information 122 indicates a "pause" button has been pressed within the user interface of the media playback controller (e.g., the specialized user interface of the activity application 114), then the activity application 114 can generate one or more commands 112. In turn, the one or more commands 112 can be provided to the user application 106 that is currently playing back media on the computing device 102. The user application 106 can then process the one or more commands 112 and pause the playback of the media.

As a brief aside, it is noted that other forms of input information 122 not illustrated in FIG. 1 also can be detected by the operating system 104 and interpreted by the user interface manager 116, the activity applications 114, and/or other entities executing on the operating system 104. The other forms of input information 122 can include, for example, mouse-based inputs, keyboard-based inputs, audio-based inputs, video-based inputs, infrared-based inputs, biometric-based inputs, and so on. It is noted that the foregoing examples are not meant to be limiting, and that the computing device 102 can be configured to receive any type, form, etc., of input information 122, at any level of granularity, without departing from the scope of this disclosure.

It should be understood that the various components of the computing devices illustrated in FIG. 1 are presented at a high level in the interest of simplification. For example, although not illustrated in FIG. 1, it should be appreciated that the various computing devices can include common hardware/software components that enable the above-described software entities to be implemented. For example, each of the computing devices can include one or more processors that, in conjunction with one or more volatile memories (e.g., a dynamic random-access memory (DRAM)) and one or more storage devices (e.g., hard drives, solid-state drives (SSDs), etc.), enable the various software entities described herein to be executed. Moreover, each of the computing devices can include communications components that enable the computing devices to transmit information between one another.

A more detailed explanation of these hardware components is provided below in conjunction with FIG. 5. It should additionally be understood that the computing devices can include additional entities that enable the implementation of the various techniques described herein without departing from the scope of this disclosure. It should additionally be understood that the entities described herein can be combined or split into additional entities without departing from the scope of this disclosure. It should further be understood that the various entities described herein can be implemented using software-based or hardware-based approaches without departing from the scope of this disclosure.

Accordingly, FIG. 1 provides an overview of the manner in which the system 100 can implement the various techniques described herein, according to some embodiments. A more detailed breakdown of the manner in which these techniques can be implemented will now be provided below in conjunction with FIGS. 2-4.

FIG. 2 illustrates a sequence diagram 200 of techniques for managing activity information associated with user applications, according to some embodiments. As shown in FIG. 2, the sequence diagram 200 begins at step 202, where a user application 106 receives a request to implement a particular functionality provided by the user application 106. For example, when the user application 106 provides timer-related functionalities, the request can be directed to starting a five-minute countdown timer. In another example, when the user application 106 provides exercise-related functionalities, the request can be directed to starting a five-kilometer running exercise. Again, these examples are not meant to be limiting.

At step 204, the user application 106 provides, to the activity manager 110, an indication that the particular functionality is commencing. In particular, and as previously described herein, the user application 106 can transmit, to the activity manager 110, activity information 108 that includes the indication that the particular functionality is commencing. For example, to indicate that the aforementioned five-kilometer running exercise is commencing, the activity information 108 can include an identifier associated with the particular type of functionality (e.g., "Exercise"), an identifier associated with the user application 106, a name of the exercise (e.g., "Running"), goals associated with the exercise (e.g., "5K"), and so on. In this manner, the activity manager 110 carry out any number of steps in preparation to receive additional data associated with the exercise, such as performance metrics that are gathered by the user application 106 as the exercise is carried out. Such steps can include, for example, accessing a container (e.g., a file, folder, database, etc.) associated with the user application 106, generating an identifier for the exercise, reserving storage space for the performance metrics that presumably will be subsequently received, and so on. It is noted that the foregoing examples are not meant to be limiting, and that the activity manager 110 can take any number, type, etc., of steps, at any level of granularity, without departing from the scope of this disclosure.

At step 206, the activity manager 110 provides, to an activity application 114, an indication that the particular functionality is being implemented by the user application. Continuing with the foregoing example, step 206 can involve the activity manager 110 identifying, among the activity applications 114 installed on the operating system 104, an activity manager 110 that corresponds to the particular functionality. In one example approach, the activity manager 110 can maintain a table that links functionality identifiers with the identifiers of activity applications 114 that are associated with the functionalities. For example, the activity manager 110 can identify, based on the functionality identifier "Exercise", that the identifier "Fitness_App" of an activity application 114 that is associated with fitness tracking. In this manner, the activity manager 110 can utilize the identifier of the activity application 114 to effectively route the indication (and, as described below, supplemental activity information 108) to the activity application 114.

At step 208, the user application 106 implements the particular functionality. This can involve, for example, the user application 106 initializing any number of sensors to track the running exercise, updating a user interface of the user application 106 to provide a dashboard of exercise information that is gathered from the sensors and processed by the user application 106, and so on. At step 210, the user application 106 provides, to the activity manager 110, activity information 108 associated with the particular functionality. This can involve, for example, the user application 106 providing the aforementioned exercise information to the activity manager 110 on an ongoing basis (e.g., an open stream of information), on a periodic basis (e.g., every few seconds), on a conditional basis (e.g., when certain milestones/goals are achieved), and so on. It is noted that the foregoing examples are not meant to be limiting, and that the user application 106 can provide activity information 108 to the activity manager 110 using any approach, and at any level of granularity, without departing from the scope of this disclosure.

At step 212, an activity application 114 composites the activity information 108 into a user interface managed by the activity application 114, where the user interface includes at least one user interface element through which at least one aspect of the particular functionality can be controlled. Continuing with the foregoing example, step 212 can involve gathering a pertinent subset of information that is normally displayed in a primary user interface managed by the user application 106. For example, if the primary user interface displays elapsed time information, pace information, heart rate information, motion information, distance information, and so on, then the pertinent subset information may include only the elapsed time information, the heart rate information, and the distance information. It is noted that the foregoing examples are not meant to be limiting, and that any approach can be used to effectively determine which information from the activity information 108 should be composited into the user interface. For example, the user application 106 can provide a template of the information that it deems pertinent, which can then guide the activity application 114 when analyzing/gathering information from the activity information 108. In another example, the activity application 114 can enforce its own rules, logic, etc., to dynamically identify information within the activity information 108 that the activity application 114 deems to be the most pertinent. In yet another example, the activity application 114 can extract information from the activity information 108 based on how the user interface of the activity application 114 is formatted, the types of information intended to be displayed within the user interface of the activity application 114, and so on. It is noted that the foregoing examples are not meant to be limiting, and that the activity application 114 can be configured to composite the activity information 108 into the user interface using any approach, at any level of granularity, without departing from the scope of this disclosure. Again, it is also noted that the user interface can be separate and distinct from a primary user interface (or other user interfaces) output by the activity application 114, depending on the context(s) under which such user interfaces are displayed.

Additionally, the at least one user interface element through which at least one aspect of the particular functionality can be controlled can be implemented in accordance with the same approaches discussed above (and/or other similar approaches). For example, the type, design, placement, functionality, etc., of the at least one user element can be guided based on information provided by the user application 106 (e.g., a template), determinations made by the activity application 114 (e.g., using rules/logic), indications provided within the activity information 108 (e.g., a description of information, functionalities, etc., and how they can be controlled), and so on. Continuing with the running exercise example discussed herein, the at least one user interface element can include, for example, an option to pause the running exercise, an option to end the running exercise, an option to activate the user application 106 that is managing the running exercise, and so on. Again, it is noted that the foregoing examples are not meant to be limiting, and that any number, type, etc., of user interface elements can be included in the user interfaces of the activity applications 114, and can be linked to any type of functionality control, at any level of granularity, without departing from the scope of this disclosure.

At step 214, the activity application 114 provides the user interface to the user interface manager 116, e.g., in the form of user interface information 115' (e.g., in accordance with the techniques described above in conjunction with FIG. 1). At step 216, the user interface manager 116 outputs at least the user interface (e.g., to a display device 120). As described above in conjunction with FIG. 1, this step can involve combining two or more of the user interfaces of the activity applications 114 (accessible via the corresponding user interface information 115') into a single user interface (e.g., such as the composite interfaces illustrated in FIG. 3 and described below).

At step 218, the user interface manager 116 receives input information from the display device 120 (e.g., in accordance with the techniques described above in conjunction with FIG. 1). At step 220, the user interface manager 116 and/or the activity application 114 derives, based on the input information 122, at least one command 112 to modify the at least one aspect of the particular functionality (discussed above in conjunction with step 212). Continuing with the running exercise example described herein, the at least one command 112 can involve pausing the running exercise. The user interface manager 116 and/or the activity application 114 can then provide the at least one command to the user application 106. As shown in FIG. 2, the at least one command 112 can be routed to the user application 106 by way of the activity manager 110, such that the activity manager 110 can perform any appropriate updates based on the at least one command 112, modify the at least one command 112, and/or the like. In turn, the activity manager 110 can provide the command 112 to the user application 106. Alternatively, the user interface manager 116 and/or the activity application 114 can provide the at least one command 112 directly to the user application 106, e.g., using a communication channel that is established between the user interface manager 116/activity application 114 and the user application 106.

At step 222, the user application 106 modifies the at least one aspect of the particular functionality. Continuing with the running exercise example described herein—where the at least one command 112 is directed to pausing the running exercise—step 222 would involve the user application 106 performing the necessary updates to effectively pause the running exercise. Such updates can include, for example, updating the primary user interface (or other user interfaces) of the user application 106, providing an indication of the pause event (e.g., via activity information 108) to the activity manager 110 (e.g., under approaches where the at least one command 112 does not flow through the activity manager 110), updating the manner in which subsequent activity information 108 is provided to the activity manager 110, and so on. It is noted that the foregoing examples are not meant to be limiting, and that the user application 106 can perform any updates, at any level of granularity, in conjunction with (or subsequent to) processing the at least one command 112.

Figure 3:
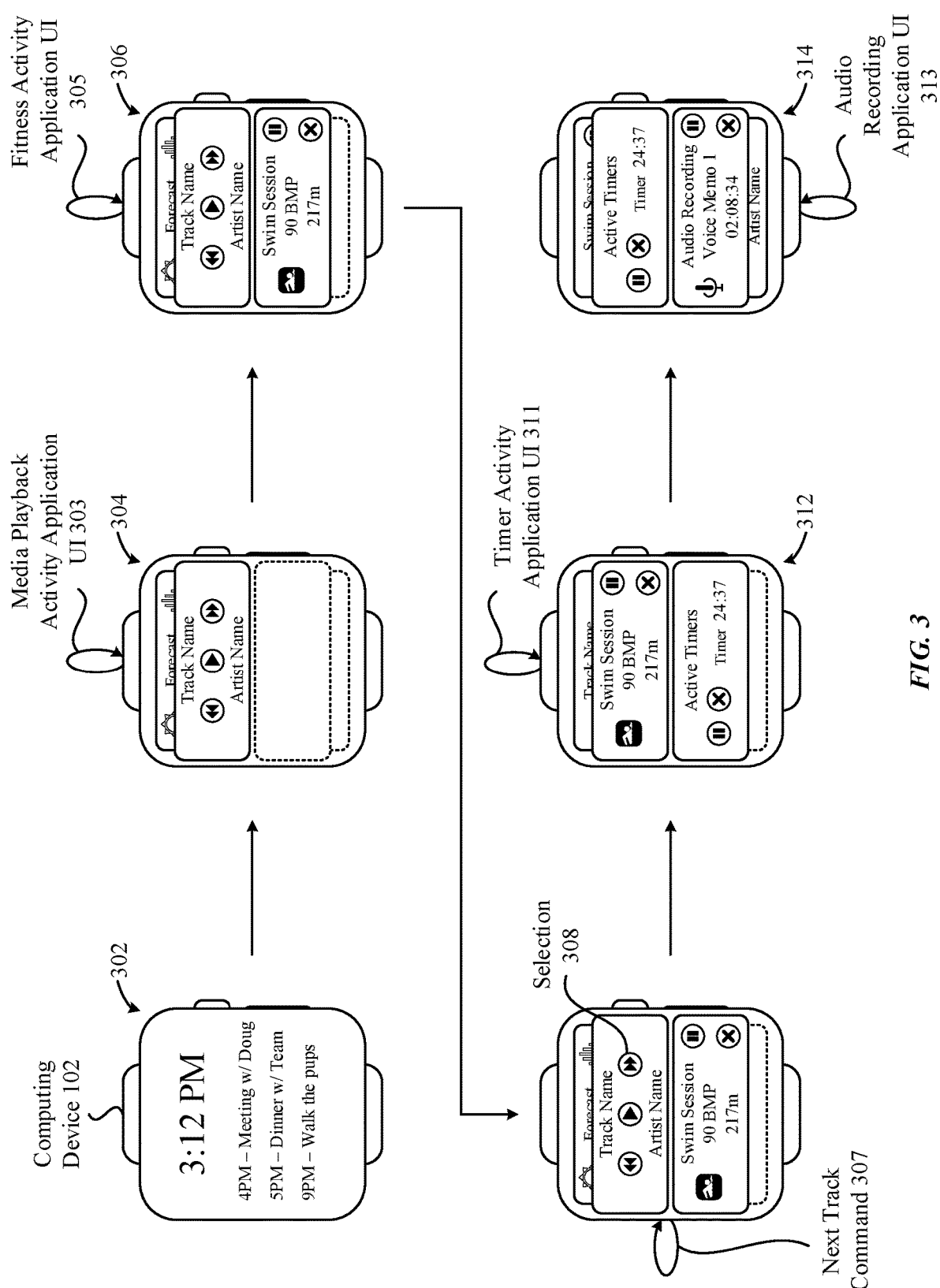
FIG. 3 illustrates conceptual diagrams of user interfaces that can be displayed on computing devices consistent with the techniques set forth in this disclosure, according to some embodiments.

FIG. 3 illustrates conceptual diagrams of user interfaces that can be displayed on computing devices 102 consistent with the techniques set forth in this disclosure, according to some embodiments. As shown in FIG. 3, a computing device 102—which takes the form of a smart watch—can display a user interface 302 that constitutes a lock/home screen that includes both a current time and upcoming calendar items. The user interface 302 can be displayed, for example, when functionalities of user applications 106 installed on the computing device 102 are not being utilized, when a user of the computing device 102 has selected an option to display the user interface 302, and so on. Again, it is noted that the computing device 102 can represent any type, form, etc., of computing device without departing from the scope of this disclosure.

As shown in FIG. 3, an example event can take place where a user interface 303 of an activity application 114 relating to media playback is generated/provided (e.g., consistent with the techniques described above in conjunction with FIGS. 1-2). In turn, when a condition arises to display the user interface 303 (and/or other user interfaces)—such as a touch gesture provided using a display device 120 of the computing device 102, a press of a physical button included on the computing device 102, a voice command, a motion gesture (e.g., a wrist shake, a wrist turn, etc.), etc.—the computing device 102 can display a user interface 304 that includes at least the user interface 303. For example, as shown in FIG. 3, the user interface 304 can include, in addition to the user interface 303, a (partial view of a) user interface for a weather application that displays information provided by a primary weather application installed on the computing device 102. As also shown in FIG. 3, the user interface 304 can include various user interface elements that enable the playback of the media content to be modified (e.g., consistent with the techniques described above in conjunction with FIGS. 1-2).

As shown in FIG. 3, another example event can take place where a user interface 305 of an activity application 114 relating to fitness activity is generated/provided (e.g., consistent with the techniques described above in conjunction with FIGS. 1-2). In turn, when a condition arises to display the user interface 305 (and/or other user interfaces), the computing device 102 can display a user interface 306 that includes the user interface 303 and the user interface 305. Additionally, as shown in FIG. 3, the user interface 306/user interface 303 can enable a selection 308 of an option to advance to a next track of a media playback queue managed by a user application 106 (that the activity application 114 (relating to media playback) is currently overseeing). In turn—and, consistent with the techniques described above in conjunction with FIGS. 1-2—a next track command 307 can be issued to the user application 106 to cause the user application 106 to advance to the next track of the media playback queue.

As additionally as shown in FIG. 3, another example event can take place where a user interface 311 of an activity application 114 relating to timer activity is generated/provided (e.g., consistent with the techniques described above in conjunction with FIGS. 1-2). In turn, when a condition arises to display the user interface 311 (and/or other user interfaces), the computing device 102 can display a user interface 312 that provides access to the user interfaces 303, 305, and 311. As further shown in FIG. 3, another example event can take place where a user interface 313 of an activity application 114 related to media recording is generated (e.g., consistent with the techniques described above in conjunction with FIGS. 1-2). In turn, when a condition arises to display the user interface 313 (and/or other user interfaces), the computing device 102 can display a user interface 314 that provides access to the user interfaces 303, 305, 311, and 313.

Again, it is noted that the conceptual diagrams illustrated in FIG. 3 are merely exemplary and not meant to be limiting. To the contrary, the user interfaces illustrated in FIG. 3 can be modified in any manner, at any level of at any level of granularity, without departing from the scope of this disclosure. For example, the user interfaces provided by the activity applications 114 and/or the user interface manager 116 can be modified so that an increased (or decreased) number of user interfaces provided by the activity applications 114 are simultaneously viewable within the user interface provided by the user interface manager 116. It is also noted that the computing device 102 can implement features that enable the user interfaces provided by the activity applications 114 to be navigated, such as gesture-based scrolling features, button-based scrolling features (e.g., rotating a physical crown dial included on the computing device 102), and so on. It is further noted that any approach for managing the user interfaces can be implemented, including the ability to add/remove user interfaces of activity applications 114. It is further noted that any approach for sorting the user interfaces can be implemented, including the ability to pin user interfaces (e.g., to a top of the stack), sorting the user interfaces based on update times, frequency of use metrics, and so on.

Accordingly, FIG. 3 illustrates conceptual diagrams of the manner in which activity information associated with user applications can be managed, according to some embodiments. A high-level breakdown of the manner in which the activity application 114 can interact with other entities discussed in conjunction with FIGS. 1-3 will now be provided below in conjunction with FIG. 4.

FIG. 4 illustrates a method 400 for managing activity information associated with user applications, according to some embodiments. As shown in FIG. 4, the method 400 begins at step 402, where the activity application 114 receives, from an activity manager executing on the computing device, an indication that a particular functionality is being implemented by a user application executing on the computing device (e.g., as described above in conjunction with FIGS. 1-3). At step 404, the activity application 114 queries the activity manager for activity information associated with the particular functionality (e.g., as also described above in conjunction with FIGS. 1-3). At step 406, the activity application 114 composites the activity information into a user interface that is managed by the activity application (e.g., as also described above in conjunction with FIGS. 1-3). At step 408, the activity application 114 causes the user interface to be output to a display device that is communicatively coupled to the computing device (e.g., as also described above in conjunction with FIGS. 1-3).

FIG. 5 illustrates a detailed view of a computing device 500 that can be used to implement the various techniques described herein, according to some embodiments. In particular, the detailed view illustrates various components that can be included in the computing devices described in conjunction with FIG. 1. As shown in FIG. 5, the computing device 500 can include a processor 502 that represents a microprocessor or controller for controlling the overall operation of the computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, and so on. Still further, the computing device 500 can include a display 510 that can be controlled by the processor 502 (e.g., via a graphics component) to display information to the user. A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that couples to a data link 512. In the case of a wireless connection, the network/bus interface 511 can include a wireless transceiver.

As noted above, the computing device 500 also includes the storage device 540, which can comprise a single disk or a collection of disks (e.g., hard drives). In some embodiments, storage device 540 can include flash memory, semiconductor (solid-state) memory or the like. The computing device 500 can also include a Random-Access Memory (RAM) 520 and a Read-Only Memory (ROM) 522. The ROM 522 can store programs, utilities, or processes to be executed in a non-volatile manner. The RAM 520 can provide volatile data storage, and stores instructions related to the operation of applications executing on the computing device 500.

The various aspects, embodiments, implementations, or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

The terms "a," "an," "the," and "said" as used herein in connection with any type of processing component configured to perform various functions may refer to one processing component configured to perform each and every function, or a plurality of processing components collectively configured to perform the various functions. By way of example, "A processor" configured to perform actions A, B, and C may refer to one or more processors configured to perform actions A, B, and C. In addition, "A processor" configured to perform actions A, B, and C may also refer to a first processor configured to perform actions A and B, and a second processor configured to perform action C. Further, "A processor" configured to perform actions A, B, and C may also refer to a first processor configured to perform action A, a second processor configured to perform action B, and a third processor configured to perform action C.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As described herein, one aspect of the present technology is the gathering and use of data available from various sources to improve user experiences. The present disclosure contemplates that in some instances, this gathered data may include personal information data that uniquely identifies or can be used to contact or locate a specific person. Such personal information data can include demographics data, location-based data, telephone numbers, email addresses, home addresses, data or records relating to a user's health or level of fitness (e.g., vital signs measurements, medication information, exercise information), date of birth, smart home activity, or any other identifying or personal information. The present disclosure recognizes that the use of such personal information data, in the present technology, can be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select to provide only certain types of data that contribute to the techniques described herein. In addition to providing "opt in" and "opt out" options, the present disclosure contemplates providing notifications relating to the access or use of personal information. For instance, a user may be notified that their personal information data may be accessed and then reminded again just before personal information data is accessed.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method for managing activity information associated with user applications, the method comprising, by an activity application executing on a computing device:
   receiving, from an activity manager executing on the computing device, an indication that a particular functionality is being implemented by a user application executing on the computing device;
   querying the activity manager for activity information associated with the particular functionality;
   compositing the activity information into a user interface that is managed by the activity application; and
   causing the user interface to be output to a display device that is communicatively coupled to the computing device.

2. The method of claim 1, wherein, prior to receiving the indication, the user application notifies the activity manager that the particular functionality is commencing.

3. The method of claim 2, wherein, subsequent to notifying the activity manager that the particular functionality is commencing, the user application provides the activity information to the activity manager on an ongoing basis.

4. The method of claim 1, wherein:
   a plurality of activity applications are executing on the computing device,
   each activity application of the plurality of activity applications manages a respective functionality and a respective specialized user interface,
   the activity application is included in the plurality of activity applications,
   the particular functionality corresponds to the respective functionality that the activity application manages, and
   the user interface corresponds to the respective specialized user interface that the activity application manages.

5. The method of claim 4, wherein causing the user interface to be output to the display device comprises:
   providing the user interface to a user interface manager executing on the computing device, wherein the user interface manager outputs the respective specialized user interfaces of the plurality of activity applications.

6. The method of claim 5, wherein, for a given activity application, the respective specialized user interface includes at least one user interface element through which at least one aspect of the respective functionality can be controlled.

7. The method of claim 6, further comprising:
   receiving input information,
   deriving, based on the input information, at least one command to modify the at least one aspect of the particular functionality, and
   causing the user application to modify the at least one aspect of the particular functionality.

8. A non-transitory computer readable storage medium configured to store instructions that, when executed by at least one processor included in a computing device, cause the computing device to implement an activity application for managing activity information associated with user applications, by carrying out steps that include:
   receiving, from an activity manager executing on the computing device, an indication that a particular functionality is being implemented by a user application executing on the computing device;
   querying the activity manager for activity information associated with the particular functionality;
   compositing the activity information into a user interface that is managed by the activity application; and
   causing the user interface to be output to a display device that is communicatively coupled to the computing device.

9. The non-transitory computer readable storage medium of claim 8, wherein, prior to receiving the indication, the user application notifies the activity manager that the particular functionality is commencing.

10. The non-transitory computer readable storage medium of claim 9, wherein, subsequent to notifying the activity manager that the particular functionality is commencing, the user application provides the activity information to the activity manager on an ongoing basis.

11. The non-transitory computer readable storage medium of claim 8, wherein:
   a plurality of activity applications are executing on the computing device,
   each activity application of the plurality of activity applications manages a respective functionality and a respective specialized user interface,
   the activity application is included in the plurality of activity applications,
   the particular functionality corresponds to the respective functionality that the activity application manages, and

the user interface corresponds to the respective specialized user interface that the activity application manages.

12. The non-transitory computer readable storage medium of claim 11, wherein causing the user interface to be output to the display device comprises:

providing the user interface to a user interface manager executing on the computing device, wherein the user interface manager outputs the respective specialized user interfaces of the plurality of activity applications.

13. The non-transitory computer readable storage medium of claim 12, wherein, for a given activity application, the respective specialized user interface includes at least one user interface element through which at least one aspect of the respective functionality can be controlled.

14. The non-transitory computer readable storage medium of claim 13, wherein the steps further include:

receiving input information, deriving, based on the input information, at least one command to modify the at least one aspect of the particular functionality, and causing the user application to modify the at least one aspect of the particular functionality.

15. A computing device configured to manage activity information associated with user applications, the computing device comprising:

at least one processor; and at least one memory storing instructions that, when executed by the at least one processor, cause the computing device to implement an activity application that carries out steps that include:

receiving, from an activity manager executing on the computing device, an indication that a particular functionality is being implemented by a user application executing on the computing device;

querying the activity manager for activity information associated with the particular functionality;

compositing the activity information into a user interface that is managed by the activity application; and

causing the user interface to be output to a display device that is communicatively coupled to the computing device.

16. The computing device of claim 15, wherein, prior to receiving the indication, the user application notifies the activity manager that the particular functionality is commencing.

17. The computing device of claim 16, wherein, subsequent to notifying the activity manager that the particular functionality is commencing, the user application provides the activity information to the activity manager on an ongoing basis.

18. The computing device of claim 15, wherein:

a plurality of activity applications are executing on the computing device, each activity application of the plurality of activity applications manages a respective functionality and a respective specialized user interface, the activity application is included in the plurality of activity applications, the particular functionality corresponds to the respective functionality that the activity application manages, and the user interface corresponds to the respective specialized user interface that the activity application manages.

19. The computing device of claim 18, wherein causing the user interface to be output to the display device comprises:

providing the user interface to a user interface manager executing on the computing device, wherein the user interface manager outputs the respective specialized user interfaces of the plurality of activity applications.

20. The computing device of claim 19, wherein, for a given activity application, the respective specialized user interface includes at least one user interface element through which at least one aspect of the respective functionality can be controlled.

* * * * *